United States Patent
Tsai et al.

(10) Patent No.: US 7,932,645 B2
(45) Date of Patent: Apr. 26, 2011

(54) VOICE COIL MOTOR WITH SURFACE COIL

(75) Inventors: Chuo-Han Tsai, Hsinchu County (TW);
Shih-Chuan Lee, Hsinchu (TW)

(73) Assignee: Vasstek International Corp.,
Science-based Industrial Park, Hsinchu (TW)

( * ) Notice: Subject to any disclaimer, the term of this patent is extended or adjusted under 35 U.S.C. 154(b) by 65 days.

(21) Appl. No.: 12/496,615

(22) Filed: Jul. 1, 2009

(65) Prior Publication Data

US 2010/0237718 A1  Sep. 23, 2010

(30) Foreign Application Priority Data

Mar. 17, 2009 (TW) .............................. 98108614 A

(51) Int. Cl.
*H02K 41/00* (2006.01)
(52) U.S. Cl. .................................................. 310/12.16
(58) Field of Classification Search ............... 310/12.16, 310/DIG. 6, 68 B
See application file for complete search history.

(56) References Cited

U.S. PATENT DOCUMENTS

| | | | | |
|---|---|---|---|---|
| 6,608,411 B2* | 8/2003 | Horng et al. | ................ | 310/68 R |
| 7,309,932 B2* | 12/2007 | Tseng | ........................ | 310/12.16 |
| 7,400,068 B2* | 7/2008 | Tseng | ........................ | 310/12.16 |
| 7,405,892 B2* | 7/2008 | Wu et al. | ........................ | 359/824 |
| 7,679,225 B2* | 3/2010 | Liu et al. | ........................ | 310/12.16 |
| 2006/0055252 A1 | 3/2006 | Tseng | | |
| 2006/0214520 A1 | 9/2006 | Tseng | | |

\* cited by examiner

*Primary Examiner* — Dang D Le
(74) *Attorney, Agent, or Firm* — Winston Hsu; Scott Margo

(57) ABSTRACT

A voice coil motor with a surface coil includes a set of magnetic sensing elements, a lens carrier physically connected to the set of magnetic sensing elements, a pedestal, and a set of printed circuit boards fixed onto the pedestal. A patterned metal layer is fabricated on the set of printed circuit boards to form the surface coil, a Hall sensor is installed on one of the printed circuit boards and transmits signals (e.g., operation voltages and feedback sensing signals) via traces fabricated on the set of printed circuit boards, so as to achieve simultaneous fabrication of the surface coil and traces, thereby saving space which is conventionally occupied by copper coils. The Hall sensor can sense a variation in a magnetic field resulting from the motion of the set of magnetic sensing elements to determine a motion status of the lens carrier.

14 Claims, 4 Drawing Sheets

VOICE COIL MOTOR WITH SURFACE COIL

BACKGROUND OF THE INVENTION

1. Field of the Invention

The present invention relates to a voice coil motor, and more particularly, to a voice coil motor with a surface coil.

2. Description of the Prior Art

In order to perform a more accurate position control for a set of lenses or an access arm of a hard disk drive, a voice coil motor (VCM) is adopted to move the set of lenses or the access arm of the hard disk drive. The structure of a VCM is primarily a coil placed within a magnetic circuit including a permanent magnet.

In an optical system employing a VCM, a distance at which a set of lenses is moved corresponds to a current flowing through a coil; therefore, when a VCM is utilized to implement the optical zoom functionality, an accurate control can be easily achieved by applying a specific current value. For example, Taiwanese Patent Application No. 1239432 (U.S. Patent Publication No. 2006/0055252), entitled "VOICE COIL MOTOR APPARATUS FOR POSITIONING", primarily utilizes a magnetic field formed between a coil and a permanent magnet when a current flows through the coil, thereby inducing an interaction propelling force according to Fleming's left-hand rule to move a carrier physically connected to the permanent magnet; at the same time, a set of lenses which is attached to the carrier is moved correspondingly, so as to achieve optical zoom and focus functionalities. In addition to a movable set of lenses, this kind of optical system further requires a more effective positioning technique that does not increase the overall volume.

FIG. 1 is a diagram illustrating a conventional voice coil motor. As shown in FIG. 1, the conventional VCM includes a moving coil 511, fixed next to a lens installation moving pedestal 52 and electronically connected to a VCM pedestal 53 in the fashion of a spiral coil. A magnetic circuit composed of a magnetic stone 513, an upper iron yoke 512 and a lower iron yoke 514 is installed at an inner circular part of an outer casing 50, causing the moving coil 511 to be placed exactly inside an air gap 515 in the magnetic circuit. However, since a space occupied by the copper coil of the moving coil 511 is large, the volume of the conventional VCM is inevitably huge.

In order to achieve a goal of positioning for an optical zoom apparatus which employs a Hall effect, a position feedback sensor, which includes a Hall sensor 45, is fixed onto a printed circuit board (PCB) 542, and the PCB 542 is wedged between the outer casing 50 and the magnetic stone 513. To detect a variation of a magnetic field, the Hall sensor 45 must face the magnetic stone 513, and the Hall sensor 45 outputs a voltage signal via an output terminal 543 as long as the moving coil 511 moves the Hall sensor 45 and the printed circuit board 542 correspondingly. The voltage signal is then processed via a voltage differential amplifier 49, and outputted to a positioning controller 552.

In order to utilize the Hall sensor 45 to act as a sensing element of feedback signals, traces on the PCB 542 must be routed to transmit operation voltages and feedback sensing signals, which not only increases fabrication and assembly costs, but also increases the complexity of an element structural design inside the VCM. The extra space occupied by the Hall sensor 45 also makes the overall volume too large. To subdue the disturbance resulting from the Hall sensor 45, the extra PCB 542 must be utilized more efficiently.

SUMMARY OF THE INVENTION

One of the primary objectives of the present invention is to form a surface coil of a patterned metal layer of a VCM, which saves space usually occupied by copper coils, thereby avoiding an over-large volume.

One of the secondary objectives of the present invention is to form a surface coil of a patterned metal layer of the VCM and traces required by a Hall sensor (for transmitting operation voltages and feedback sensing signals) and place the Hall sensor in one of the set of sensing elements to simultaneously form the surface coil and the traces, which saves on fabrication costs as well as space usually occupied by copper coils and avoids an over-large volume.

Another of the secondary objectives of the present invention is to set a groove on a side of the magnetic sensing element facing the surface coil, wherein the groove is large enough for the Hall sensor to fit between one of the set of the magnetic sensing elements and the surface coil, which reduces an overall volume and thereby avoids an over-large volume due to the Hall sensor.

To realize the objectives mentioned above, the present invention provides a VCM with a surface coil, characterized in that the VCM includes: a set of magnetic sensing elements, a lens carrier which is physically connected to the set of magnetic sensing elements and carries a lens, a pedestal, a set of printed circuit boards which are fixed onto the pedestal, and a set of surface coil which is formed by a patterned metal layer on the set of the printed circuit board and faces the set of magnetic sensing elements respectively. The pedestal and a plurality of guide posts are monolithically formed as one piece. Furthermore, there are at least two guide posts set onto the pedestal symmetrically. In addition, an interaction between the surface coil supplied with power and a main magnetic flux provided by the set of magnetic sensing elements makes the lens carrier move in a straight line along a direction of the guide posts.

To realize the objectives mentioned above, the present invention further provides a VCM with a surface coil, characterized in that the VCM includes: a set of magnetic sensing elements, a lens carrier which is physically connected to the set of magnetic sensing elements and carries a lens, a pedestal, a set of printed circuit boards which are fixed onto the pedestal, a set of surface coil which is formed by a patterned metal layer on the set of the printed circuit board and faces the set of magnetic sensing elements respectively, and a sensing element which is set in one of the set of printed circuit boards and is for transmitting signals via a trace formed on the set of printed circuit boards, wherein the sensing element is placed between the set of magnetic sensing elements and the surface coil, the sensing element senses a variation in a magnetic field resulting from the motion of the set of magnetic sensing elements to determine a motion status of the lens carrier. The pedestal and a plurality of guide posts are formed in one piece. Furthermore, there are at least two guide posts set onto the pedestal symmetrically. In addition, an interaction between the surface coil supplied with power and a main magnetic flux provided by the set of magnetic sensing elements makes the lens carrier move in a straight line along a direction of the guide posts. A patterned metal layer is fabricated on the set of printed circuit boards to form the surface coil, and a Hall sensor is installed in one of the printed circuit boards and transmits signals (e.g., operation voltages and feedback sensing signals) via traces fabricated on the set of printed circuit boards, so as to achieve fabricating the surface coil and traces simultaneously, saving space which is usually occupied by copper coils. The Hall sensor can sense a variation in a magnetic field resulting from the motion of the set of magnetic sensing elements to determine a motion status of the lens carrier.

These and other objectives of the present invention will no doubt become obvious to those of ordinary skill in the art after reading the following detailed description of the preferred embodiment that is illustrated in the various figures and drawings.

DETAILED DESCRIPTION

The following further describes the present invention in detail in conjunction with various figures and embodiments.

Figure 1:
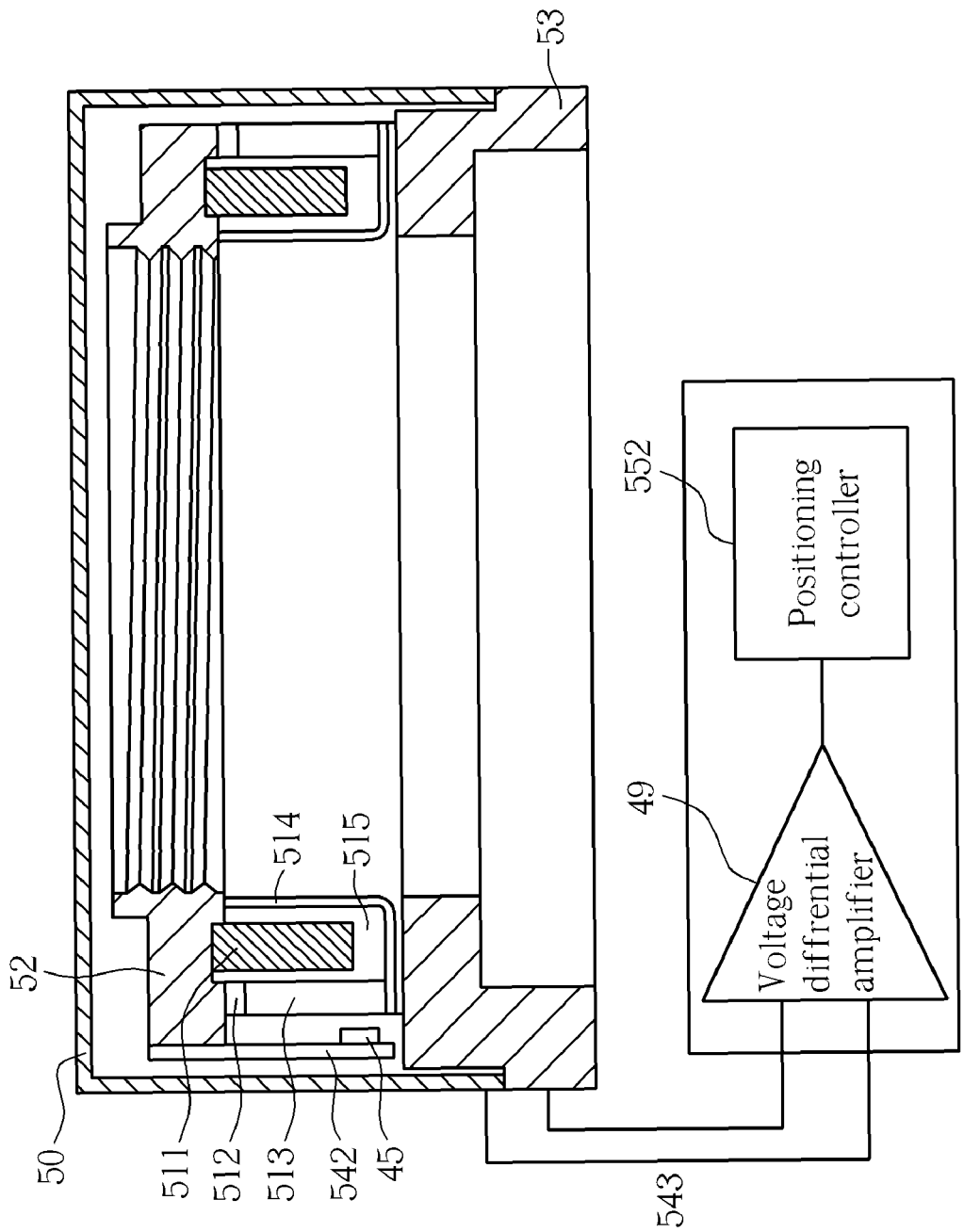
FIG. 1 is a diagram of a conventional voice coil motor.
Figure 2:
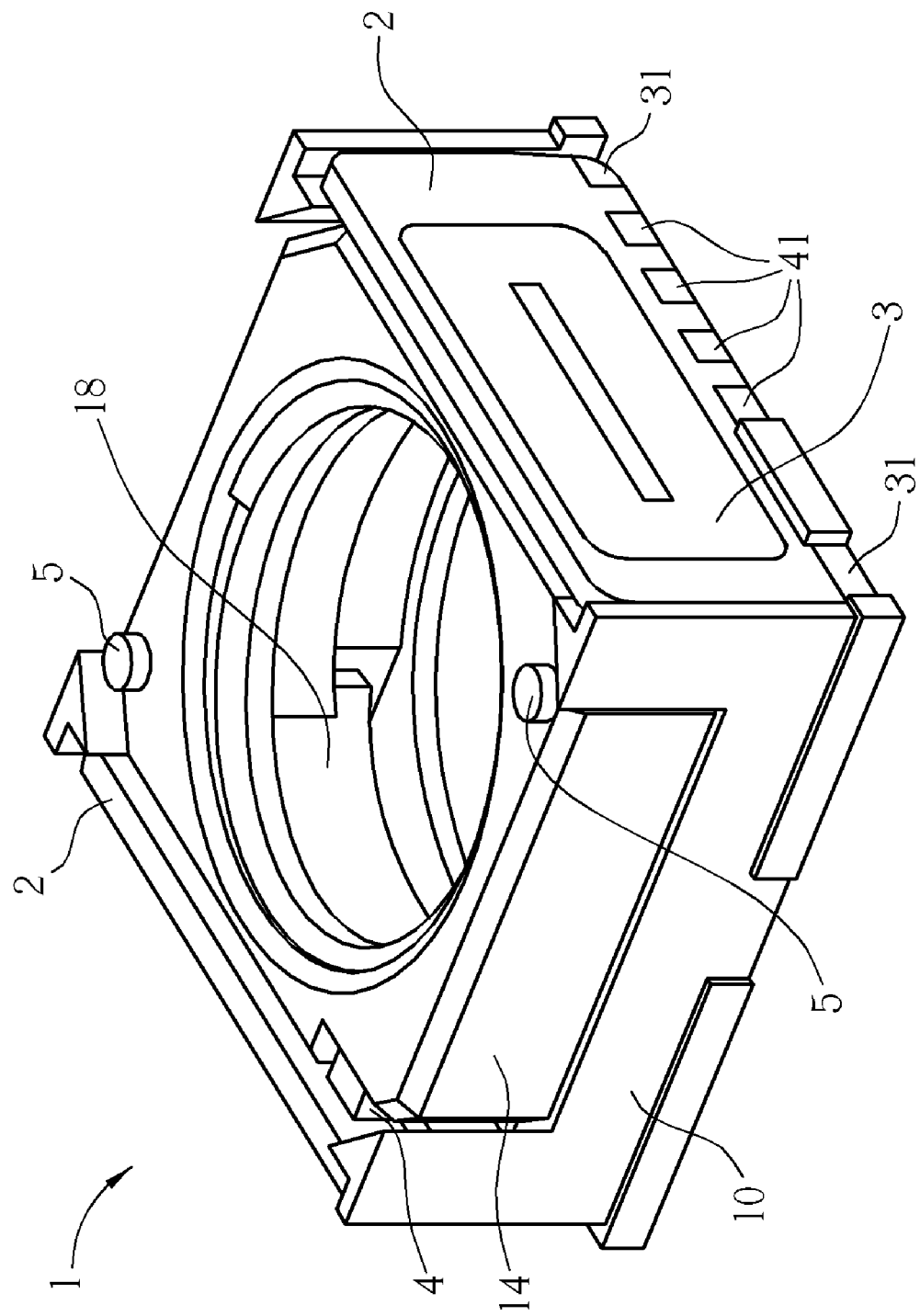
FIG. 2 is a diagram of a voice coil motor according to the present invention.

Please refer to FIG. 2, which is a diagram of a VCM according to the present invention. As shown in FIG. 2, a VCM 1 with a surface coil includes: a set of magnetic sensing elements 18, a lens carrier 14 physically connected to the set of magnetic sensing elements 18, a pedestal 10, a set of printed circuit boards 2 which is fixed onto the pedestal 10, and a surface coil 3. The lens carrier 14 is for carrying a lens (which is not illustrated in the figure). The pedestal 10 and a plurality of guide posts 5 are monolithically formed in one piece, and at least two guide posts 5 are set onto the pedestal 10. The lens carrier 14 has a plurality of holes for the guide posts to fit in.

The surface coil 3 is formed on the set of printed circuit boards 2, thereby saving space occupied by copper coils and avoiding an over-large volume.

Considering the cost factor, if the surface coil 3 and traces (i.e., metal layers covered by solder mask and exposed sensor pins 41) required by a sensing element, e.g., a Hall sensor 4, are simultaneously fabricated, the objective of low fabrication cost can be achieved.

In order to form the surface coil 3 and traces required by the Hall sensor 4, a patterning is implemented by etching, mechanic or laser onto foil means (not illustrated in the figure) on an insulating substrate (not illustrated). The patterned metal layer of the surface coil 3 and traces required by the Hall sensor 4 are thereby formed on the set of printed circuit boards 2, and a solder mask is spread over the patterned metal layer while exposing coil pins 31 of the surface coil 3, sensor pins 41 of the Hall sensor 4 and connecting pads (not illustrated) of the Hall sensor 4. The surface coil 3 is a surface metal layer substantially appearing as loops. The coil pins 31 are for providing currents for the surface coil 3, and the sensor pins 41 are for an external controller to provide operation voltages and feedback sensing signals to the installed Hall sensor 4. The connecting pads of the Hall sensor are for installation of the Hall sensor 4.

To achieve the optical zooming, when the set of printed circuit boards 2 with the surface coil 3 is fixed onto the pedestal 10, the surface coil 3 needs to face the set of the magnetic sensing element 18 such that when the surface coil 3 is powered, an interaction between the surface coil 3 and a main magnetic flux provided by the set of magnetic sensing elements 18 makes the lens carrier 14 and the lens thereof move in a straight line along a direction of the guide posts 5.

After completing the aforementioned patterned metal layer, the Hall sensor 4 is installed onto the set of printed circuit boards 2, and signals (operation voltage and feedback sensing signals) can be transmitted to the external controller via the traces formed on the set of printed circuit boards 2.

In order to utilize the Hall sensor 4 to provide positioning functionality, when the set of printed circuit boards 2 on which the Hall sensor is installed is fixed onto the pedestal 10, the Hall sensor 4 needs to be disposed between the set of magnetic sensing elements 18 and the surface coil 3 to sense a variation of a magnetic field resulting from a motion of the set of magnetic sensing elements 18, to thereby determine a motion status of the lens carrier 14 and the lens thereof. It should be noted that the Hall sensor 4 could be disposed on only one of the set of printed circuit boards 2.

The extra Hall sensor 4, which is installed for the purpose of positioning, may easily result in a huge overall volume of the VCM 1 due to the inherent volume of the Hall sensor 4. Therefore, some special considerations should be made when considering an allocation of the Hall sensor 4.

Figure 3A:
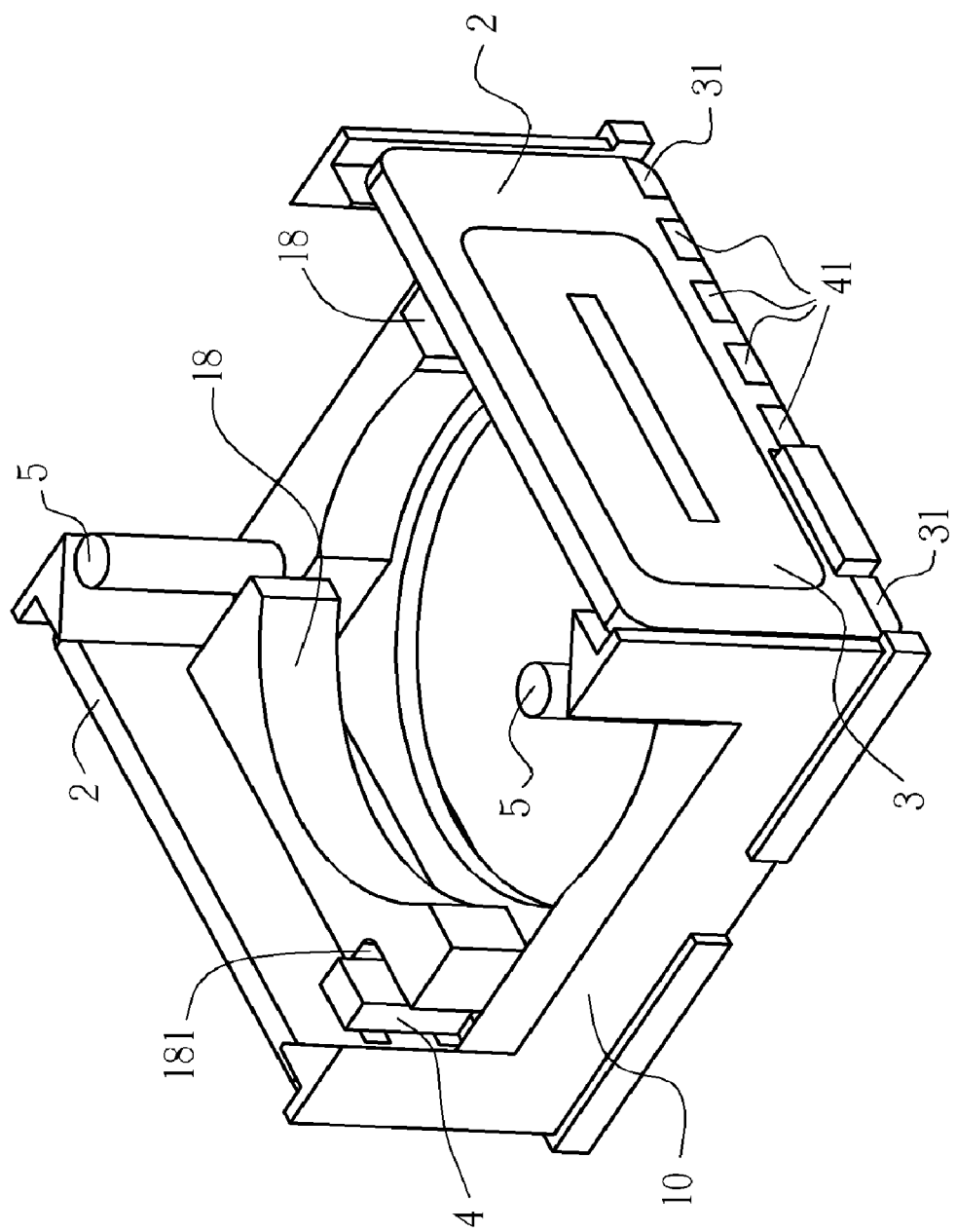
FIG. 3A is another diagram of a voice coil motor according to the present invention.
Figure 3B:
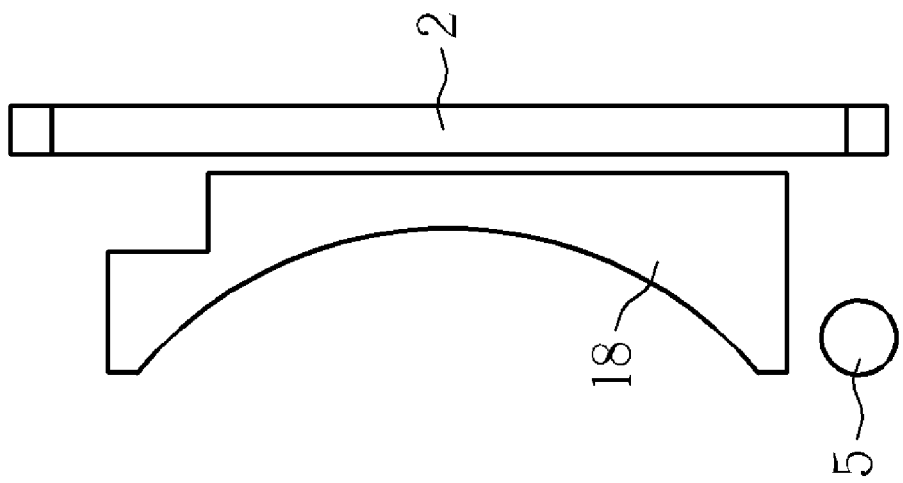
FIG. 3B is another diagram of a voice coil motor according to the present invention.
Figure 3B:
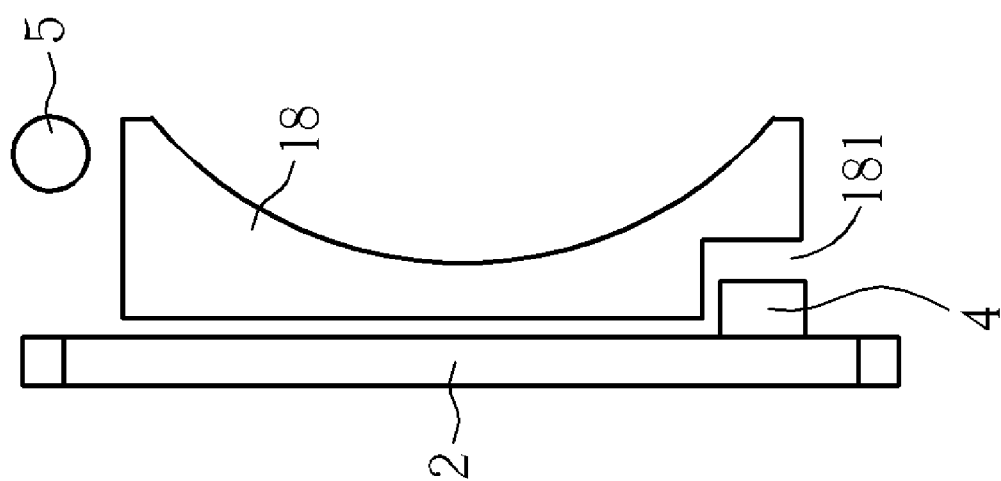

Please refer to FIG. 3A and FIG. 3B, which are other diagrams of the VCM according to embodiments of the present invention. As shown in the figures, a groove 181 is set on one side of the set of magnetic sensing elements 18, wherein the side of the set of magnetic sensing elements 18 faces the surface coil 3, and a size of the groove 181 corresponds to a volume of the Hall sensor 4 such that the Hall sensor 4 is able to be fitted in between the set of magnetic sensing elements 18 and the surface coil 3 without increasing the overall volume of the VCM 1.

In all embodiments, as the surface coil 3 is formed on the set of printed circuit boards 2, space conventionally occupied by copper coils can be saved, thereby avoiding an over-large volume of the VCM.

Those skilled in the art will readily observe that numerous modifications and alterations of the device and method may be made while retaining the teachings of the invention.

What is claimed is:

1. A voice coil motor, comprising:
   a set of magnetic sensing elements;
   a lens carrier, physically connected to the set of magnetic sensing elements, for carrying a lens;
   a pedestal;
   a set of printed circuit boards, fixed onto the pedestal; and
   a set of surface coil, formed by a patterned metal layer on the set of printed circuit boards and facing the set of magnetic sensing elements respectively;
   wherein the pedestal and a plurality of guide posts are monolithically formed in one piece.

2. The voice coil motor of claim 1, wherein an interaction between the surface coil supplied with power and a main magnetic flux provided by the set of magnetic sensing elements makes the lens carrier move in a straight line along a direction of the plurality of guide posts.

3. The voice coil motor of claim 1, wherein there are at least two guide posts set onto the pedestal symmetrically.

4. The voice coil motor of claim 3, wherein an interaction between the surface coil supplied with power and a main magnetic flux provided by the set of magnetic sensing elements makes the lens carrier move in a straight line along a direction of the at least two guide posts.

5. A voice coil motor, comprising:
   a set of magnetic sensing elements;
   a lens carrier, physically connected to the set of magnetic sensing elements, for carrying a lens;
   a pedestal;
   a set of printed circuit boards, fixed onto the pedestal;

a set of surface coil, formed by a patterned metal layer on the set of printed circuit boards and facing the set of magnetic sensing elements respectively; and a sensing element, installed on one of the set of printed circuit boards, for transmitting signals via a trace formed on the set of printed circuit boards, wherein the sensing element is disposed between the set of magnetic sensing elements and the surface coil so that the sensing element senses a variation in a magnetic field resulting from a motion of the set of magnetic sensing elements to determine a motion status of the lens carrier;

wherein the pedestal and a plurality of guide posts are monolithically formed in one piece.

6. The voice coil motor of claim 5, wherein a groove is set on one side of the set of magnetic sensing elements, the side of the set of magnetic sensing elements faces the surface coil, and a size of the groove corresponds to a volume of the sensing element such that the sensing element is able to be fitted in between the set of magnetic sensing elements and the surface coil.

7. The voice coil motor of claim 5, wherein an interaction between the surface coil supplied with power and a main magnetic flux provided by the set of magnetic sensing elements makes the lens carrier move in a straight line along a direction of the plurality of guide posts.

8. The voice coil motor of claim 5, wherein there are at least two guide posts set onto the pedestal symmetrically.

9. The voice coil motor of claim 8, wherein an interaction between the surface coil supplied with power and a main magnetic flux provided by the set of magnetic sensing elements makes the lens carrier move in a straight line along a direction of the at least two guide posts.

10. A voice coil motor, comprising:
a set of magnetic sensing elements;
a lens carrier, physically connected to the set of magnetic sensing elements, for carrying a lens;
a pedestal;
a set of printed circuit boards, fixed onto the pedestal;
a set of surface coil, formed by a patterned metal layer on the set of printed circuit boards and facing the set of magnetic sensing elements respectively; and
a sensing element, installed on one of the set of printed circuit boards, for transmitting signals via a trace formed on the set of printed circuit boards, wherein the sensing element is disposed between the set of magnetic sensing elements and the surface coil so that the sensing element senses a variation in a magnetic field resulting from a motion of the set of magnetic sensing elements to determine a motion status of the lens carrier;
wherein a groove is set on one side of the set of magnetic sensing elements, the side of the set of magnetic sensing elements faces the surface coil, and a size of the groove corresponds to a volume of the sensing element such that the sensing element is able to be fitted in between the set of magnetic sensing elements and the surface coil.

11. The voice coil motor of claim 10, wherein the pedestal and a plurality of guide posts are monolithically formed in one piece.

12. The voice coil motor of claim 10, wherein an interaction between the surface coil supplied with power and a main magnetic flux provided by the set of magnetic sensing elements makes the lens carrier move in a straight line along a direction of the plurality of guide posts.

13. The voice coil motor of claim 10, wherein there are at least two guide posts set onto the pedestal symmetrically.

14. The voice coil motor of claim 13, wherein an interaction between the surface coil supplied with power and a main magnetic flux provided by the set of magnetic sensing elements makes the lens carrier move in a straight line along a direction of the at least two guide posts.

* * * * *